UNITED STATES PATENT OFFICE.

WILLIAM A. HALL, OF BELLOWS FALLS, ASSIGNOR OF ONE-HALF TO STARKS EDSON, OF SAXTON'S RIVER, VERMONT.

PAINT.

SPECIFICATION forming part of Letters Patent No. 438,621, dated October 21, 1890.

Application filed September 27, 1889. Serial No. 325,279. (No specimens.)

*To all whom it may concern:*

Be it known that I, WILLIAM A. HALL, a citizen of the United States, residing at Bellows Falls, in the county of Windham and State of Vermont, have invented certain new and useful Improvements in Paints; and I do hereby declare the following to be a full, clear, and exact description of the invention, such as will enable others skilled in the art to which it appertains to make and use the same.

This invention relates to the manufacture of paints; and it consists in a novel composition or mixture of ingredients, which may be termed "water-paint." The substance, briefly stated, consists of a dry powder, the component parts of which will be subsequently disclosed. When desired for use, it is to be mixed in boiling water, using, preferably, four parts powder to three parts water.

The object of my invention is to produce a paint which does not scale off or crack; further, one which does not contain oil—hence very cheaply made—and, lastly, one which furnishes a coating or finish highly fire-proof and very lasting.

To produce a new chemical compound which after being mixed with water and allowed to dry shall possess certain distinctive features of its own, as above premised, I proceed as follows: The base of the powder or compound, which is to be mixed in a dry state, is to consist of hydrous silicate of magnesia. To this is added a certain amount of dextrine, while calcined plaster, as a suitable setting material, is united with the above. Lastly, a small quantity of powdered alum and salt are thoroughly incorporated with them. The above combination of ingredients is now in readiness for use.

The proportions which I use and from which the best results are obtained to produce one hundred pounds of my new compound are as follows: Eighty-one pounds of hydrous silicate of magnesia, ten pounds of dextrine, six pounds of calcined plaster, one pound of powdered alum, and two pounds of chloride of sodium or common salt. I do not desire to be limited, however, to the above specific or exact proportions, since some of the ingredients may be increased and some diminished in quantity to produce certain desired changes in the effects of the paint—as, for example, to make it harder or to give it a higher luster, or for other purposes. After compounding this powder, and to render it applicable after the manner of common paint, preferably four parts of the powder are to be mixed with three parts of water, the latter at boiling-point. Hot water is preferably added first in order to dissolve the more insoluble matter. An immediate and thorough stirring should now occur, when the paint should then be of the consistency of cream. When necessary to use it in a more dilute form, it may be reduced by the addition of cold water.

This paint differs essentially from common paint, since no oil or spirits are employed. Further, it differs radically from calcimine, since it does not spot with water and does not soften with age, nor does it rub off. Moreover, it is highly fire-proof and presents a very hard surface, and consequently does not require frequent retouching nor the need of repeated fresh applications. Coloring-matter may be added as taste or circumstances dictate. This paint can be applied in a thicker condition than other materials for a similar purpose, and therefore one coat of this will cover better than two applications of ordinary paint or calcimine.

What I desire to claim is—

1. A dry paint composed of hydrous silicate of magnesia, dextrine, calcined plaster, powdered alum, and salt, mixed in suitable proportions and adapted to be applied as a surface-covering in a liquid state, after the manner of paint, by the addition of water, substantially as stated.

2. A paint composed of hydrous silicate of magnesia, dextrine, calcined plaster, powdered alum, and salt in the form of a powder, combined with hot water to reduce it to a proper consistency, substantially as herein set forth.

3. A paint composed of hydrous silicate of magnesia, dextrine, calcined plaster, powdered alum, and salt, combined with hot water and with suitable coloring-pigments, substantially as and for purposes specified.

In testimony whereof I affix my signature in presence of two witnesses.

WM. A. HALL.

Witnesses:
H. E. LODGE,
FRANCIS C. STANWOOD.